(12) United States Patent
Yu et al.

(10) Patent No.: US 7,737,642 B2
(45) Date of Patent: *Jun. 15, 2010

(54) DC/AC INVERTER

(75) Inventors: Chung-che Yu, Taipei (TW);
Shih-chung Huang, Taipei (TW);
Chien-pang Hung, Taipei (TW);
Chih-shun Lee, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 416 days.

This patent is subject to a terminal disclaimer.

(21) Appl. No.: 11/580,186

(22) Filed: Oct. 13, 2006

(65) Prior Publication Data

US 2007/0029945 A1    Feb. 8, 2007

(51) Int. Cl.
*H05B 37/02* (2006.01)
(52) U.S. Cl. .................................. 315/224; 315/307
(58) Field of Classification Search .................. 363/31, 363/40, 41, 95, 97, 98, 124, 131, 132, 16–17; 315/127, 119, 128, 175, 225, 307, 291, 314
See application file for complete search history.

(56) References Cited

U.S. PATENT DOCUMENTS

| 5,677,602 | A | 10/1997 | Paul |
| 6,259,615 | B1 * | 7/2001 | Lin ............................. 363/98 |
| 6,750,842 | B2 | 6/2004 | Yu |

FOREIGN PATENT DOCUMENTS

| CN | 1667458 A | 9/2005 |
| TW | 1270839 | 1/2007 |

* cited by examiner

*Primary Examiner*—Rajnikant B Patel
(74) *Attorney, Agent, or Firm*—Winston Hsu

(57) ABSTRACT

A DC/AC inverter provided for transforming a DC voltage source into an AC power source, wherein the AC signal is used for driving a fluorescent lamp. The inverter comprises a half-bridge switch circuitry electrically connected to the DC voltage source, for outputting an AC signal, a resonant tank electrically connected between the half-bridge switch circuitry and the fluorescent lamp, for stepping up and filtering the AC signal into a high-voltage AC power source which is supplied to a load, and a controller feeding back an output of the fluorescent lamp, providing a pulse width modulation signal for turning on and off the half-bridge switch circuitry, such that the fluorescent lamp can operate consistently and provide a consistent brightness.

16 Claims, 6 Drawing Sheets

DC/AC INVERTER

BACKGROUND OF THE PRESENT INVENTION

1. Field of Invention

The present invention relates to a DC/AC inverter, and more particularly to a DC/AC inverter for driving a background fluorescent lamp of an LCD, especially for a plurality of power operated half-bridge DC/AC inverter designed for driving a plurality of fluorescent lamps.

2. Description of Related Arts

As liquid crystal displays (LCD) thinner than conventional cathode ray tube (CRT) monitors, they are being used in more and more homes and public display. However, since LCD is operated by its optical rotary power and optical characteristic to display image and text information, hence not illuminable, it requires an additional backlight source. An example of backlight source for LCD is fluorescent lamps.

A typical DC/AC inverter utilizes a full-bridge inverter circuit, along with a resonant tank and a step-up transformer, a DC power input can be filtered and converted to a high AC voltage by the resonant tank and the step-up transformer, so as to drive the fluorescent lamp.

In order to stabilize the light emitted by the fluorescent lamp, and prevent a change in light intensity while there is a change in the power input voltage, most inverters are incorporated with negative feedback circuits for stabilizing the current in the fluorescent lamp. As the life-span of the fluorescent lamp is affected by the symmetry of the waveform of the current, it is most popular to use full-bridge inverter to drive fluorescent lamps.

Referring to FIG. 1 of the drawing, a conventional full-bridge inverter is illustrated. As shown in FIG. 1, a full-bridge inverter 100 comprises a DC voltage source 101, a full-bridge switch circuitry 102, a resonant tank 103, a fluorescent lamp 104, a current sensing circuit 105, a pulse width modulator 106, a frequency generator 107, and a full-bridge switch driver circuit 108, wherein the full-bridge switch circuitry 102 comprises four power switches 101A, 101B, 101C and 101D. The resonant tank 103 comprises a step-up transformer 120 and two resonant capacitors 121 and 122. The frequency generator 107 comprises a triangular wave generator 110 and a pulse generator 109. The full-bridge switch driver circuit 108 provides four sets of driving signal R1, R2, R3 and R4.

The DC voltage source 101 is electrically connected to the full-bridge switch circuitry 102, wherein the output of the full-bridge switch circuitry 102 is electrically connected to an input of the resonant tank 103. An output of the resonant tank 103 is electrically connected to a terminal of the fluorescent lamp 104. The series connection between the full-bridge switch circuitry 102, the resonant tank 103 and the fluorescent lamp 104 is a typical example of a power transfer connection.

The current sensing circuit 105 is electrically connected to the fluorescent lamp 104 and the pulse width modulator 106. The pulse width modulator 106 is then electrically connected to the frequency generator 107 and the full-bridge switch driver circuit 108, which is electrically connected to the gate terminals of the full-bridge switch circuitry 102, forming a control loop connection.

Conventional full-bridge inverter is operated based on the a fixed high frequency conduction between the four power switches of the full-bridge switch circuitry 102, such that the DC voltage output by the DC voltage source 101 is transformed to and outputted as a fixed high-frequency AC square wave, which is provided for being inputted to the resonant tank 103. The resonant tank 103 utilizes the step-up characteristic and the filter function of the step-up transformer 120 to transform the fixed high-frequency AC square wave to a fixed high frequency AC sine wave, which is provided to the fluorescent lamp 104.

The control loop utilizes the current sensing circuit 105 to produce a feedback signal R5, which corresponds to a fluorescent lamp current, which is then transferred to the pulse width modulator 106. The pulse width modulator 106, together with the a triangular wave output R6 by the triangular wave generator 110 of the frequency generator 107, utilizing the theory of negative feedback, produces a pulse width modulation signal R7 for inputting to the full-bridge switch driver circuit 108, wherein the full-bridge switch driver circuit 108 utilizes the pulse width modulation signal R7 and the frequency generator 107 to produce the four sets of driving signals R1, R2, R3 and R4 so as to drive the four power switches 101A, 101B, 101C and 101D.

By controlling the conduction period between the two power switches 101A and 101D, and the conduction period between the two power switches 101C and 101B, the alternating conduction between 101A and 101D, and 101C and 101B provides a stable fluorescent lamp current which is an AC current having a symmetrical waveform.

This conventional type of full-bridge inverter circuits can stably control the current of a fluorescent lamp, however, has the draw back of having a great number of switches, pushing the production cost of such circuits higher.

As a result, the present invention is to provide a cheaper and more reliable DC/AC inverter.

SUMMARY OF THE PRESENT INVENTION

A main object of the present invention is to provide a circuitry of a DC/AC inverter for driving a fluorescent lamp circuit, wherein the DC/AC inverter uses less power switches to control the operation of the fluorescent lamp, producing lower DC voltage ripple, which in turn lowers noise caused by system ripples.

Another object of the present invention is to provide the circuitry of a half-bridge DC/AC inverter, having an advantage of using less power switches and lower production cost, together with an alternating operation to achieve lower DC voltage ripple, which in turn lowers noise caused by system ripples when multi fluorescent lamps are operated.

Another object of the present invention is to provide two sets of power switch driving signals of the DC/AC inverter, such that the duty cycle of each of the two sets of power switch driving signals alters symmetrically with respect to that of the other power switch driving signals. Since the power switches do not conduct simultaneously upon receiving the DC voltage, the noise of the DC voltage source is minimized.

Another object of the present invention is to provide a plurality of sets of power switch driving signals of the DC/AC inverter, which is applied to a plurality of fluorescent lamps, such that the fluorescent lamps can utilize frequency generators to generate a plurality of signals with identical frequency and different phases as frequency sources.

Accordingly, in order to accomplish the above objects, the present invention provides a DC/AC inverter for transforming a DC power source to an AC power source, an AC signal of which is used to drive a fluorescent lamp, wherein the DC/AC inverter comprises:

a half-bridge switch circuitry electrically connected to the DC power source;

a resonant tank electrically connected between the half-bridge switch circuitry and the fluorescent lamp, wherein the resonant tank steps-up and filters the AC signal from the half-bridge switch circuitry, such that the AC signal is transformed to the AC power source; and a controller feeding back an output of the fluorescent lamp, providing a pulse width modulation signal to control, the conduction of the half-bridge switch circuitry so as to drive the fluorescent lamp being operated around the resonant frequency of the fluorescent lamp according to the conduction condition of the half-bridge switch circuitry.

These and other objectives, features, and advantages of the present invention will become apparent from the following detailed description, the accompanying drawings, and the appended claims.

DETAILED DESCRIPTION OF THE PREFERRED EMBODIMENT

Figure 1:
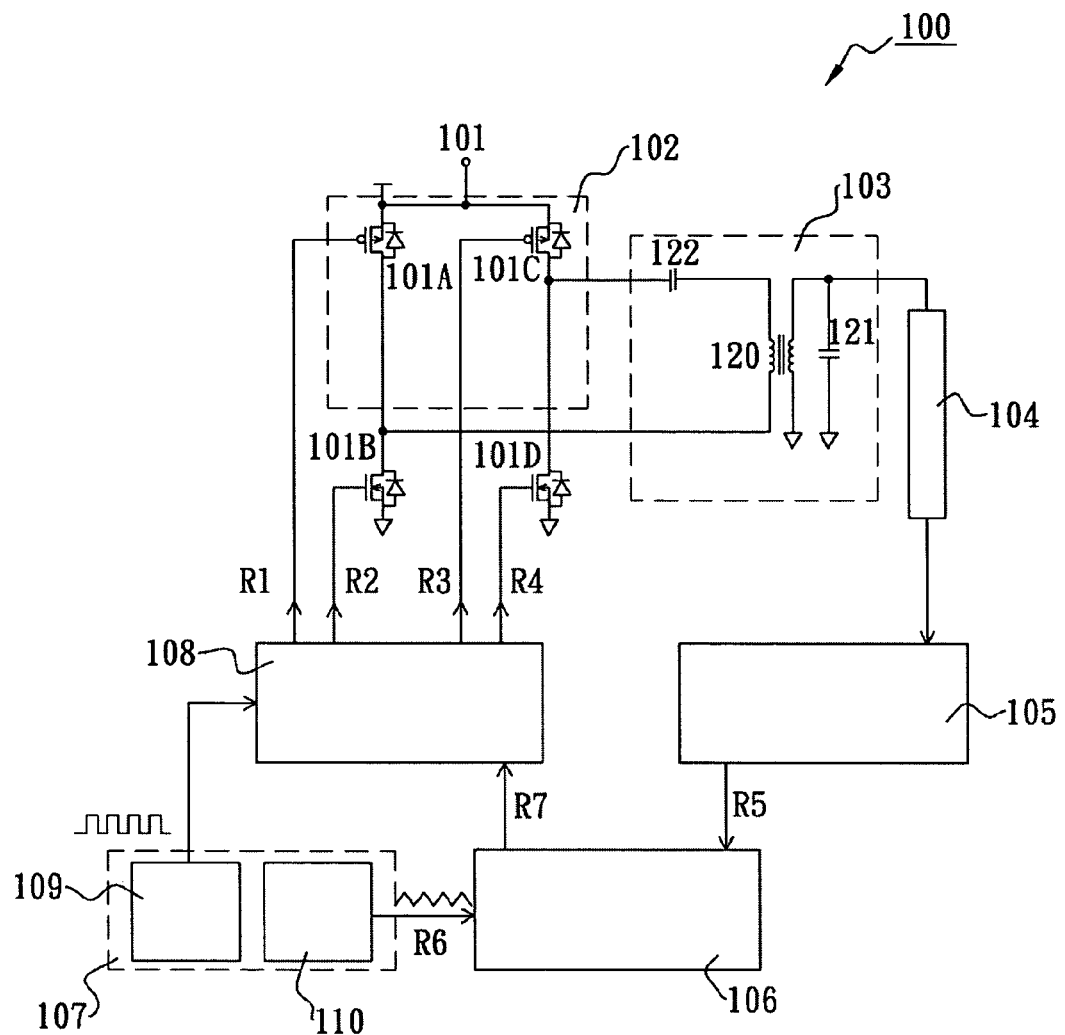
FIG. 1 illustrates a prior art of a full-bridge fluorescent lamp inverter circuitry.
Figure 2:
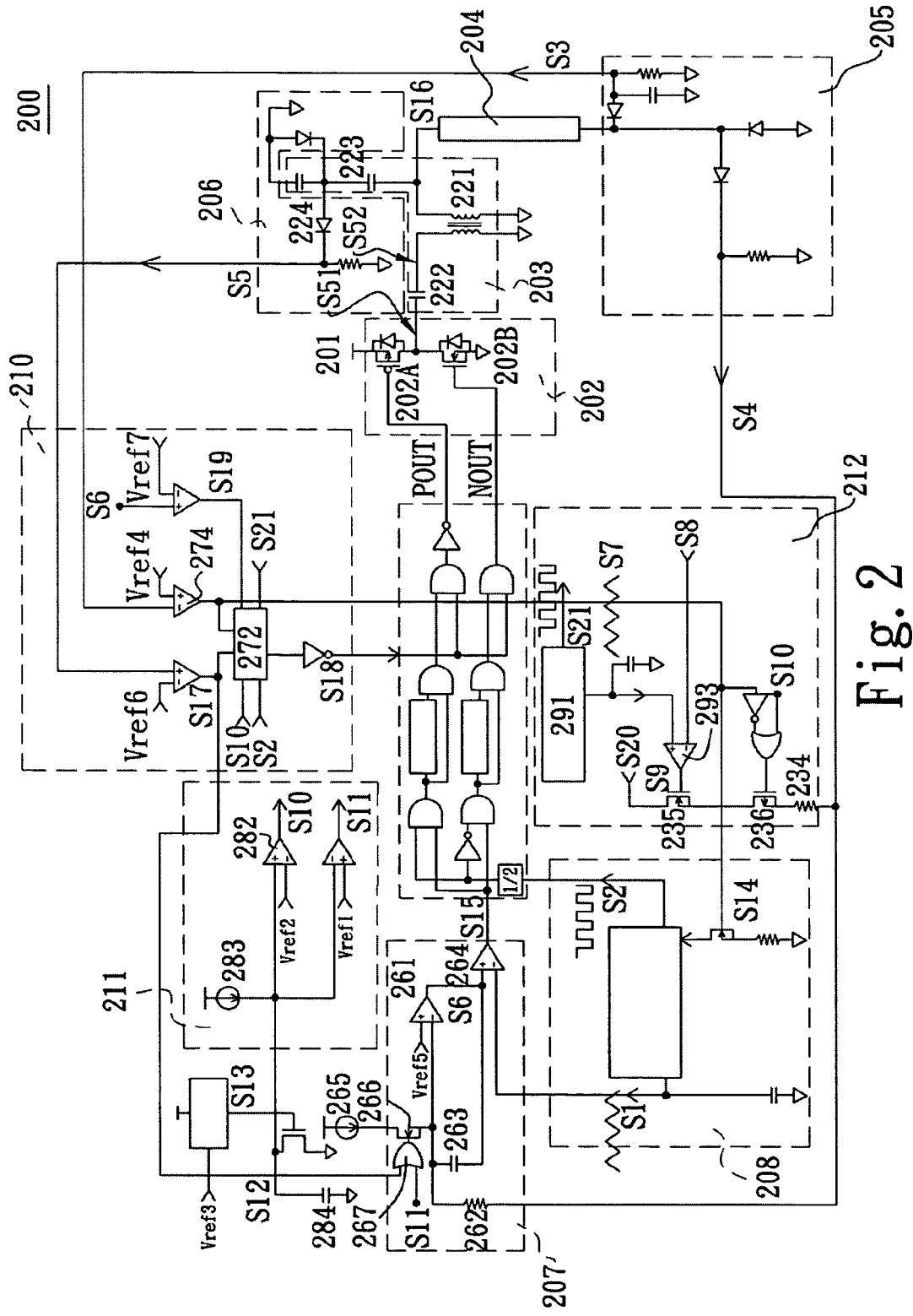
FIG. 2 illustrates a circuitry of a DC/AC inverter according to a preferred embodiment of the present invention.

Referring to FIG. 2 of the drawings, a circuitry of a DC/AC inverter according to the preferred embodiment of the present invention is illustrated, wherein the DC/AC inverter is a half-bridge DC/AC inverter.

As shown in the drawing, an inverter controller 200 comprises a DC voltage source 201, a half-bridge switch circuitry 202, a resonant tank 203, a fluorescent lamp 204, a current sensing circuit 205 for sensing a lamp current of the fluorescent lamp 204, a voltage sensing circuit 206 for sensing a terminal voltage of the fluorescent lamp 204, a pulse width modulator 207, a frequency generator 208, a driver circuit 209, which is a half-bridge switch driver circuit, a protection circuit 210, a timer 211, and a dimming control circuit 212.

The DC voltage source 201 is electrically connected to the half-bridge switch circuitry 202, one of the switch 202A is connected to a DC voltage line and the other one 202B is connected to the ground, wherein through an output of the half-bridge switch circuitry 202, the half-bridge switch circuitry 202 is electrically connected to the resonant tank 203 though an input of the resonant tank 203. Through an output of the resonant tank, the resonant tank 203 is also electrically connected to the fluorescent lamp 204. The resonant tank 203 further comprises a step-up transformer 221 and resonant capacitors 222, 223, and 224.

The electrical connection method between the elements of the DC/AC inverter is conventionally known as power transfer connection. According to the preferred embodiment of the present invention, a Low Q resonant tank is used so as to provide easy designing of the circuitry.

Figure 3:
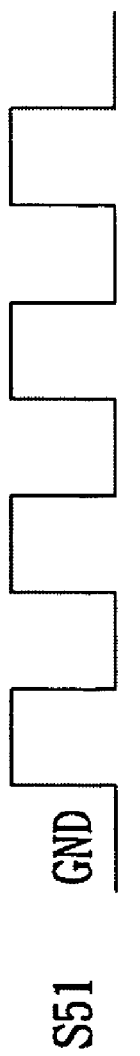
FIG. 3 illustrates some waveforms of the circuitry of the DC/AC inverter according to the above preferred embodiment of the present invention.
Figure 3:
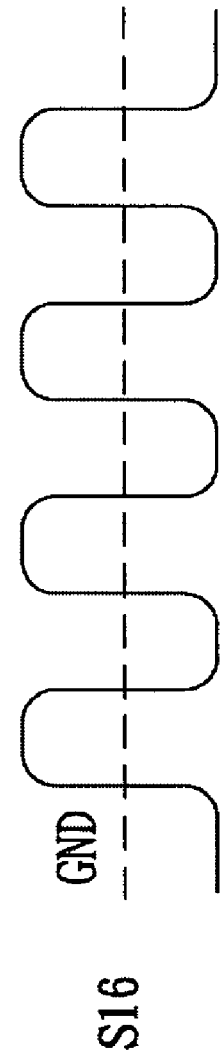

Under such a circuitry design, the waves that drive the step-up transformer 221, and the fluorescent lamp 204 is quasi sine waves or quasi square waves, as oppose to pure square waves or pure sinusoidal waves. FIG. 3 of the drawings illustrates the voltage wave form at different positions under the power transmission route design according to the preferred embodiment.

In FIG. 3 of the drawings, S51 is the voltage waveform of the output end of the half-bridge switch circuitry 202 and S16 is the voltage waveform of the driving signal output by the step-up transformer 221.

The current sensing circuit 205 and the voltage sensing circuit 206 are electrically connected to the ends of the fluorescent lamp 204 respectively. The current sensing circuit 205 is also electrically connected to the pulse width modulator 207, wherein the pulse width modulator 207 is also electrically connected to the frequency generator 208 and the driver circuit 209. The driver circuit 209 is in turn electrically connected to the half-bridge switch circuitry 202, forming a control loop connection.

The half-bridge switch circuitry 202 comprises two power switches 202A and 202B. According to the preferred embodiment of the present invention, the power switch 202A connected to the voltage line is a P-type MOSFET, while the power switch 202B connected to ground line is an N-type MOSFET. However, the power switches are not limited to MOSFET, and can also be another semiconductor switches, such as BJT switches.

The frequency generator 208 generates a triangular wave signal S1 and a pulse signal S2, wherein both signals have the same frequency. However, the present invention is not limited to the use of triangular wave signals, where all ramp signals and sawtooth wave signals are applicable.

The current sensing circuit 205 and the fluorescent lamp 204 are in series to provide a signal S3 for indicating the conduction of the fluorescent lamp 204, and utilize a second signal S4 to show the current value of the current flowing through the fluorescent lamp 204. The voltage sensing circuit 206 utilizes the resonant capacitors 223 and 224 of the resonant tank 203 to obtain a third signal S5 for indicating a terminal voltage of the fluorescent lamp 204.

The pulse width modulator 207 comprises an error amplifier 261, a resistor 262, and a capacitor 263, and a comparator 264. The pulse width modulator 207 also comprises a controlled current source 265, which is electrically connected to an inverse input of the error amplifier 261 through a switch 266.

The driver circuit 209 comprises two driving signals POUT and NOUT. The protection circuit 210 comprises a logic control circuit 272. The protection circuit 210 receives the signal S3 capable of indicating the conduction state of the fluorescent lamp, the third signal S5 capable of indicating the terminal voltage of the fluorescent lamp, and an output signal S6 of the error amplifier 261 in the pulse width modulator 207.

The timer 211 comprises two comparators 281 and 282, and a current source 283. The dimming control circuit 212 comprises a dimming control frequency generator 291, wherein a triangular signal S7 and a dimming control voltage S8 are generated by the dimming control frequency generator 291. The triangular signal S7 is delivered to a non-inverting input of a comparator 293, and the dimming control voltage S8 is delivered to an inverting input of the comparator 293. After comparison, a dimming control pulse signal S9 is generated, the dimming control circuit 212 further comprises an OR gate 296 for controlling the timing of the outputting of the dimming control pulse signal S9 to the pulse width modulator 207.

According to the preferred embodiment of the present invention, the timer 211 functions in a manner such that a timer capacitor 284 is being charged by the current source 283, such that a voltage S12 of the timer capacitor 284 increases as time increases. Before the voltage S12 reaches a first reference voltage Vref1, a reset signal S11 is being sent out. When the voltage S12 reaches a second reference voltage Vref2, a time out signal S10 will be sent out.

The current source 283 is being controlled by a signal S13 capable of indicating the system voltage, such that when the system voltage is lower than a third reference voltage Vref3, the current source 283 will be cut off, and the voltage S12 of the timer capacitor 284 earthed. Through such design, every time when the system starts up the DC voltage source 201 from a zero voltage, the timer capacitor 284 of the timer 211 is charged started from zero voltage.

According to the preferred embodiment of the present invention, the frequency generator 208 is also controlled by a fourth signal S14, indicating whether or not the fluorescent lamp is conducted. When the fluorescent lamp is conducted, an operation frequency is sent out. When the fluorescent lamp is not conducted, a start-up frequency is sent out.

An advantage of such a design is that the resonant frequency of the resonant tank 203 can operated by the different operation frequencies according to the conduction state of the fluorescent lamp, such that the system can be operated around the resonant frequency, whether or not the fluorescent lamp is conducted, such that the system is operated efficiently.

The fourth signal S14 is determined by the signal S3 provided by the current sensing circuit 205, and a comparator 274 of the protection circuit 210, such that when the signal S3 exceeds a fourth reference voltage of Vref4, the fluorescent lamp 204 is considered as being conducted.

Under normal circumstances, the detailed operation procedures according to the preferred embodiment of the present invention are as follows:

After staring up to supply voltage to the system, the timer 211 initializes the charging of the timer capacitor 284, such that before the voltage of the timer capacitor 284 reaches the first reference voltage Vref1, the reset signal S11 being sent out by the timer 211 passes through an OR gate 267, turning on a switch 266, such that the current source 265 is connected to the inverting input of the error amplifier 261, forcing an input voltage of the inverting input of the error amplifier 261 to be higher than a fifth reference voltage Vref5, which in turn forces an error output S6 to be zero.

When the timer capacitor 284 continue to charge until the capacitor voltage is greater than the first reference voltage Vref1, the switch 266 will be turned off, such that the pulse width modulator 207 is initialized, and because of the fluorescent lamp 204 is not conducted, the inverting input voltage of the error amplifier 261 becomes lower than the fifth reference voltage Vref5, causing the output signal S6 outputted by the error amplifier 261 to increase under the effect of negative feedback.

After comparing with the triangular wave signal S1, the comparator 264 of the pulse width modulator 207 outputs a pulse width modulation signal S15. The driver circuit 209 receives the pulse width modulation signal S15 and the pulse signal S2 so as to produce the driving signals POUT and NOUT to drive the power switch 202A and 202B respectively.

Before the conduction of the fluorescent lamp 204, the voltage S16 of the fluorescent lamp 204 will increase due to a widening of duty cycle of the pulse width modulation signal S15. Upon sensing the third signal S5 exceeding a sixth reference voltage Vref6, the voltage sensing circuit 206 sends out an over voltage signal S17, which passes through the OR gate 267 and turn on the switch 266 of the current source 265, to the inverting input of the error amplifier 261, so as to reduce the output signal S6 of the error amplifier 261, whereby decreasing the duty cycle of the pulse width modulation signal S15 and decreasing the amount of electrical power input to the fluorescent lamp.

If the effect of this decreasing in amount of electrical power input to the fluorescent lamp is a sensing of the third signal S5 to be less than the sixth reference voltage Vref6, the switch 266 will be turned off, increasing the output signal S6 of the error amplifier 261. As a result, the voltage S16 of the fluorescent lamp 204 is stably adjusted under such a negative feedback control.

As soon as the fluorescent lamp is conducted by a sufficient voltage S16 of the fluorescent lamp 204 and for a substantial period of time, according to the characteristic of the fluorescent lamp, the voltage S16 of the fluorescent lamp 204 will drop to less than half the voltage required for conducted operation, such that the voltage sensing circuit 206 loses its function due to a non-detection of a higher voltage.

At the same time, the current sensing circuit 205 sends out the signal S3 to the protection circuit 210, producing the fourth signal S14 to alter the output frequency of the frequency generator 208, and outputting the second signal S4 to the pulse width modulator 207, such that the current flowing through the fluorescent lamp is stabilized on a pre-determined value through the negative feedback control.

According to the preferred embodiment of the present invention, the protection circuit is operated as follows:

When the fluorescent lamp is not connected, the third signal S5 will continuously send out a signal indicating that the terminal voltage of the fluorescent lamp exceeds the sixth reference voltage Vref6 to the logic control circuit 272, which receives the time out signal S10 of the timer 211.

The logic control circuit 272 will take no action until the time out signal S10 is inputted. Once the time out signal S10 reaches the logic control circuit 272, and in the condition of the terminal voltage of the fluorescent lamp exceeds the sixth reference voltage Vref6, it times with another digital timer (not shown in the diagram), by the pulse signal S2 produced by the frequency generator 208 to time.

If the terminal voltage of the fluorescent lamp still exceeds the sixth reference voltage Vref6 after a predetermined period of time, a terminating signal S18 will be outputted by the logic control circuit 272 to the driver circuit 209, so as to cut off the conduction of the power switches 202A and 202B.

If the fluorescent lamp is damaged during operation, the fourth signal S14 will be sent out, indicating that the fluorescent lamp is not conducted, to the logic control circuit 272, receiving the time out signal S10 from the timer 211. The logic control circuit 272 will not take any action until the receiving the time out signal S10.

When time is up, the logic control circuit 272, under the condition of the fourth signal S14 indicating that the fluorescent lamp is not conducted, will time with a second digital timer, through a second pulse signal S21 produced by the low frequency dimming control circuit 212.

If the lamp still is not conducted after a predetermined period of time, the logic control circuit 272 will output the terminating signal S18 to the driver circuit 209, so as to cut off the conduction of the power switches 202A and 202B.

Also, when, the step-up transformer 221 encounters serious damage, such as power leakage, creating an overloading effect, the entire system will be overloaded. Under such conditions, the error amplifier 261 will continue to increase its outputting of the output signal S6, so as to provide sufficient power to stabilize the current of the fluorescent lamp. If the leakage is greater than the maximum power provided by the system, the error amplifier 261 will definitely exceed the peak value of the triangular wave signal S1.

The protection circuit 210 compares the output signal S6 of the error amplifier 261 with a seventh reference voltage Vref7, the value of which is slightly higher than the peak value of the triangular wave signal, to obtain an overloading signal S19, indicating whether or not the system is overloaded.

Similarly, if the overloading signal S19 indicates that the system is overloaded when the timer 211 initializes the protection circuit 210, and, if the timing using the pulse signal S2, which passes through the logic control circuit 272 and is produced by the frequency generator 208, also exceeds the predetermined period of time, the logic control circuit 272 then outputs the terminating signal S18 to the driver circuit 209, cutting off the conduction of the power switches 202A and 202B.

According to the preferred embodiment of the present invention, the inverter further has the dimming control circuit 212 provided for controlling the termination and restarting of the power provided to the fluorescent lamp. It makes use of the adjusting of brightness ratio to adjust the brightness of the fluorescent lamp. In order to avoid the creating of the flashing feeling created by a low frequency, the brightness frequency is normally controlled to be above 200 Hz.

The dimming control circuit is controlled by two signals, the first one being the fourth signal S14 indicating whether or not the fluorescent lamp is conducted, and the second one being the time out signal S10 of the timer 211. Only when the fourth signal S14 indicates that the fluorescent lamp is conducted or the timer 211 receives the time out signal S10, a switch 236 controlling the output of the dimming control signal will be turned on.

A dimming control voltage S20 of the dimming control circuit is higher than the fifth reference voltage Vref5. When the dimming control voltage S20 passes through the switches 235 and 236 to be connected to a second resistor 234 and the pulse width modulator 209, the output signal S6 of the error amplifier 261 of the pulse width modulator 297 is decreased, cutting off electricity transferring of the system to avoid overloading.

When the switch 235 is turned off by the dimming control pulse signal S9, the pulse width modulator 207 is reopened and restarting to provide electrical power to the system.

Dimming control effect can be achieved by a low frequency to control the ratio between the stopping and the restarting of providing electrical power of each cycle. In order to ensure that the fluorescent lamp has sufficient and continuous electrical power so as to be ignited in a predefined period of time, the time when brightness can be adjusted is determined by whether or not the fluorescent lamp is conducted.

In order to provide an AC current with good symmetry to drive the fluorescent lamp 204, according to the preferred embodiment of the present invention, when the system is operated steadily, the half-bridge switch circuitry 202 is alternately conducted with the same duty cycle, but shifted by 180 degrees.

Figure 4:
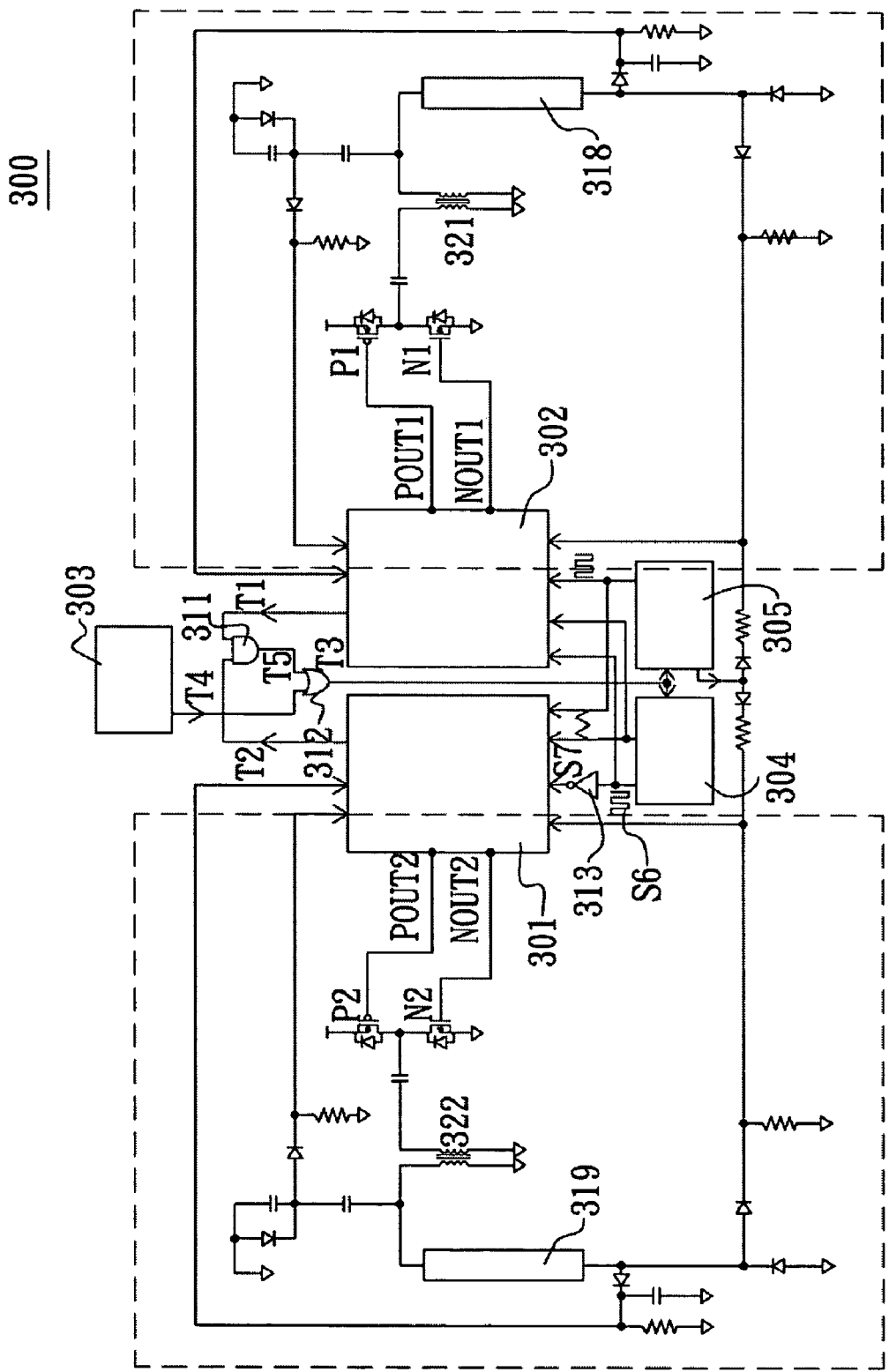
FIG. 4 illustrates a circuitry of two DC/AC inverters according to an alternative embodiment of the present invention.

Referring to FIG. 4 of the drawings, an alternative embodiment of the present invention is illustrated, wherein two sets of DC/AC inverters are operated and applied to two fluorescent lamps simultaneously. The elements in each of a first inverter set 301 and a second inverter set 302 is substantially the same as that of the DC/AC inverter as shown in FIG. 2 of the drawings.

It should be noted that a timer 303 is shared by the first and the second inverter set 301 and 302, and, in order to be applicable to the two sets of inverters according to this embodiment of the present invention, a frequency generator 304 and a brightness adjusting circuit 305 must be appropriately altered.

A frequency control signal T3 of the frequency generator 304 determines when a change in frequency is required, according to a first conduction confirmation signal T1 (similar to S14 of FIG. 2) and a second conduction confirmation signal T2 of the first and the second inverter set 301 and 302 respectively, and a timer signal T4 of the timer 303.

After passing the conduction confirmation signals T1 and T2 through an AND gate 311, a third conduction confirmation signal T5 is obtained. After passing the third conduction confirmation signal T5 and the timer signal T4 though an OR gate 312, the frequency control signal T3 is obtained.

An operation frequency of the frequency generator 304 will be changed after the fluorescent lamps are all conducted or the timer signal T4 outputted by the timer 303. As a result, the frequency of the system can still be altered even when one of the fluorescent lamps is damaged.

The frequency control signal T3 is also used for controlling the dimming control circuit 305. The outputting moment of the dimming control circuit 305 for adjusting the brightness is also after the conduction of the fluorescent lamps, or after the timer 303 outputted the timer signal T4. As a result, not only can it be ensured that both lamps are successfully lit up, brightness adjustment can still be achieved even when one of the lamps is damaged.

A second pulse signal T7 is produced when a first pulse signal T6, which is outputted by the frequency generator 304 to the DC/AC inverter, passes through an inverter 313. Utilizing the first pulse signal T6 and the second pulse signal T7 having the same frequency as but out of phase of the first pulse signal T6, such that the first DC/AC inverter outputs a first set of driving signals POUT1 and NOUT1, for driving a first power switch P1 and N1.

The second DC/AC inverter outputs a second set of driver out signals POUT2 and NOUT2 for driving a second power switch P2 and N2, wherein the second set of driving signals has the same frequency as but out of phase of the first set of driving signals.

Figure 5:
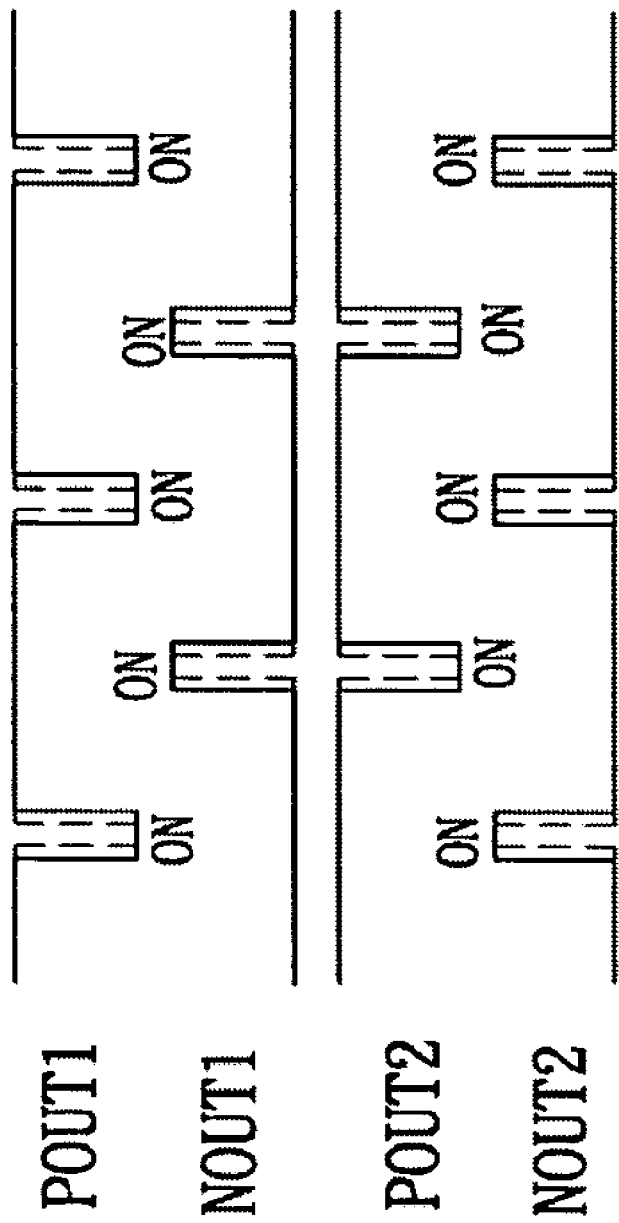
FIG. 5 illustrates a sequential marked graph according to the above alternative embodiment of the present invention.

Referring to FIG. 5 of the drawings, a sequential marked graph of the driving signals according to this alternative embodiment of the present invention is illustrated. The dashed portion of FIG. 5 shows the change in duty cycle of the driving signals POUT1, NOUT1 and POUT2, NOUT2.

In order to keep the symmetry of the lamp driving current, the change between the duty cycle between the driving signals POUT1, NOUT1 and POUT2, NOUT2 is symmetrical. Since the driving signals POUT1 and POUT2 will not be conducted simultaneously, a voltage noise of the power source will be reduced.

Referring to FIG. 5 of the drawings, because POUT1 and POUT2 is out of phase by 180 degrees, the current flowing into the fluorescent lamps 318 and 319 will be reversed. Also, by adjusting the polarity of the transformers 321 and 322, the current flowing into the fluorescent lamp 318 and 319 can be altered to be in phase.

When more than two fluorescent lamps are in use, a plurality of frequency generators, each having the same frequency but out of phase with each other, is used as a frequency source to drive the fluorescent lamp.

Figure 6:
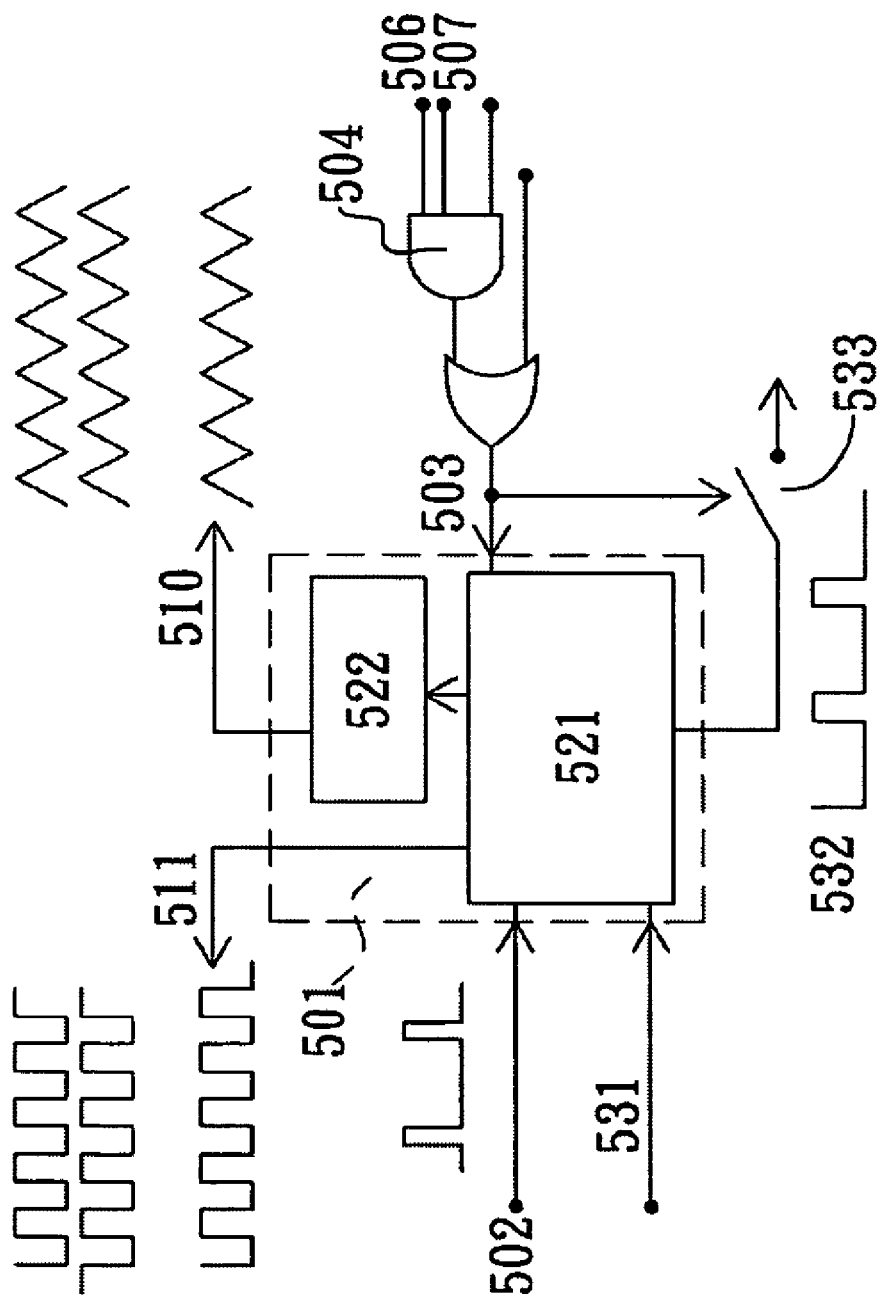
FIG. 6 illustrates a circuitry of a plurality of DC/AC inverters according to yet another alternative embodiment of the present invention.

Referring to FIG. 6 of the drawings, a plurality of frequency generators provided for driving N number of DC/AC inverters according to this alternative embodiment of the present invention is illustrated. The input of the plurality of frequency generators 501 can be an external clock pulse 502, which can be any one frequency related to the control signal of the LCD display The other input is a frequency control signal 503.

The frequency control signal 503 utilizes an AND gate 504 and an OR gate 505 to control the changing of the operation frequency of the fluorescent lamp, according to the conduction confirmation signals 506, 507, 508 . . . N, confirming whether or not all the N number of fluorescent lamps are conducted, or upon the outputting of a timer signal 509 by the timer.

Each of the triangular wave signal 510 output by the plurality of frequency generators 501 to each of the pulse width modulator has the same frequency but out of phase. Each of the pulse signal 511 output to each of the switch driver circuit has the same frequency as and in phase with the triangular wave signal 510.

After the dimming control signal 531 entering the plurality of frequency generators 501, the plurality of frequency generator 501 generates a dimming control pulse signal 532 that is produced with a frequency that is relative to the LCD control frequencies, such that the frequency control signal 503 controls the switch 533, so as to control when the dimming control pulse signal 532 is outputted to each of the DC/AC inverters.

Such a plurality of frequency generator 501 can be achieved by the use of a conventional micro control unit (MCU) 521, together with a direct digital synthesizer (DDS) 522.

Due to the fact that not the power switch of the DC voltage source will not be conducted all at the same time, as oppose to conventional circuitry, noises related to the power source is minimized. And since the operation frequency is synchronized with the LCD controller, visual disturbance due to interference caused by frequency difference can be minimized too.

The usage of the outputting method of the frequency generator is not limited to half-bridge DC/AC inverters. When there are more than two sets of fluorescent lamp, this outputting method can also be applied full-bridge or other control systems that use the same frequency, so as to minimize noises related to the power source and visual disturbance. Also, the present invention utilizes fluorescent lamp to illustrate the preferred embodiment, but its application should not be limited to fluorescent lamp. The present invention as disclosed above can be applied to any lighting element.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A DC/AC inverter for inverting a DC voltage source to an AC power source to drive a load, the DC/AC inverter comprising:
    a resonant tank coupled to said load for transforming DC input power to an AC signal to supply power to said load;
    a half-bridge power switch circuitry coupled to said resonant tank and said DC voltage source for selectively coupling said DC voltage source to said resonant tank, the half-bridge power switch circuitry comprising:
        a first switch having an input terminal coupled to the DC voltage source, an output terminal coupled to the resonant tank, and a control terminal; and
        a second switch having an input terminal coupled to a ground line, an output terminal coupled to the resonant tank, and a control terminal;
    a current sensing circuit coupled to said load for providing a conduction sensing signal indicating conductive state of said load, and a current sensing signal indicating current amplitude of said load;
    a driving circuit coupled to the control terminal of the first switch and the control terminal of the second switch for transmitting a first driving signal to the control terminal of the first switch, and a second driving signal to the control terminal of the second switch according to a reference clock and a pulse width modulation signal;
    a pulse width modulator comprising:
        an error amplifier having an inverting terminal for receiving the current sensing signal, a non-inverting terminal for receiving a reference voltage, and an output terminal for outputting an error signal according to a comparison result of the current sensing signal and the reference voltage; and
        a comparator having an inverting terminal for receiving a modulation signal, a non-inverting terminal for receiving the error signal, and an output terminal for outputting the pulse width modulation signal according to the modulation signal and the error signal; and
    a frequency generator electrically coupled to the pulse width modulator and the driving circuit, said frequency generator for outputting the modulation signal to the comparator;
    wherein an operation frequency of said frequency generator is converted from a first frequency to a second frequency according to said conduction sensing signal.

2. The DC/AC inverter, as recited in claim 1, wherein said current sensing circuit is a current sensing circuit comprising a resistor and a diode in series.

3. The DC/AC inverter, as recited in claim 1, further comprising:
    a timer providing a timing signal; and
    a protection circuit coupled to said timer and determining whether or not to disable the DC/AC inverter according to said timing signal.

4. The DC/AC inverter, as recited in claim 3, further comprising a dimming control circuit coupled to said timer and determining whether or not to function according to said timing signal.

5. The DC/AC inverter, as recited in claim 4, wherein said frequency generator changes said operation frequency while said conduction sensing signal is larger than a predetermined value.

6. The DC/AC inverter, as recited in claim 3, wherein said protection circuit determines whether or not to stop said half-bridge power switch circuitry according to said current sensing signal.

7. A DC/AC inverter for inverting a DC voltage source to an AC power source to drive a load, the DC/AC inverter comprising:
    a resonant tank coupled to said load for transforming DC input power to an AC signal to supply power to said load;
    a half-bridge power switch circuitry coupled to said resonant tank and said DC voltage source for selectively coupling said DC voltage source to said resonant tank; and
    a controller coupled to said half-bridge power switch circuitry to control said half-bridge power switch circuitry selective coupling said DC voltage source with said resonant tank to provide said input power, wherein an operation frequency of said controller is converted from a first frequency to a second frequency while a resonant frequency of said resonant tank is changed, and a difference between said second frequency and said changed resonant frequency is smaller than a difference between said first frequency and said changed resonant frequency.

8. The DC/AC inverter, as recited in claim 7, wherein said controller has two predetermined operation frequencies and operates at one of said predetermined operation frequencies determined according to said sensing signal.

9. The DC/AC inverter, as recited in claim 8, wherein said controller comprises:
   a timer providing a timing signal; and
   a protection circuit coupled to said timer and determining whether or not to function according to said timing signal.

10. The DC/AC inverter, as recited in claim 9, wherein said controller further comprises a dimming control circuit coupled to said timer and determining whether or not function according to said timing signal.

11. An inverter controller comprising:
   a frequency generator for generating a reference signal and a modulation signal;
   a pulse width modulator coupled to said frequency generator for providing a pulse width modulation signal according to said modulation signal;
   a driver circuit coupled to said pulse width modulator for generating at least one driving signal according to said pulse width modulation signal and said reference signal; and
   a half-bridge power switch circuitry driven by said at least one driving signal and coupled to a DC voltage source;
   wherein a frequency of said reference signal and said modulation signal is adjusted according to a load sensing signal.

12. The inverter controller, as recited in claim 11, further comprising:
   a timer generating a timing signal; and
   a protection circuit coupled to said driver circuit determining whether or not the driver circuit functions according to said timing signal.

13. The inverter controller, as recited in claim 12, further comprising a dimming control circuit coupled to said timer and determining whether or not to function according to said timing signal.

14. The inverter controller, as recited in claim 13, wherein said load sensing signal indicates a current flowing through said load and is generated by a current sensing circuit.

15. The inverter controller, as recited in claim 14, wherein said frequency generator has two predetermined operation frequencies and operates at one of said predetermined operation frequencies determined according to said load sensing signal.

16. The inverter controller, as recited in claim 11, wherein one of the half-bridge switches connects to the DC voltage source and the other half-bridge switch connects to ground.

* * * * *

UNITED STATES PATENT AND TRADEMARK OFFICE
CERTIFICATE OF CORRECTION

PATENT NO.         : 7,737,642 B2
APPLICATION NO.    : 11/580186
DATED              : June 15, 2010
INVENTOR(S)        : Chung-che Yu et al.

It is certified that error appears in the above-identified patent and that said Letters Patent is hereby corrected as shown below:

On the title page, add -- Related U.S. Application Data (63) Continuation-in-part of application No. 10/968,857, filed on Oct. 18, 2004, now Pat. No. 7,148,633. --

Signed and Sealed this

Twenty-sixth Day of October, 2010

David J. Kappos
*Director of the United States Patent and Trademark Office*